(12) United States Patent
Maida et al.

(10) Patent No.: US 8,463,281 B2
(45) Date of Patent: Jun. 11, 2013

(54) POWER SETTING

(75) Inventors: Aminu Wada Maida, Swindon (GB); Alan James Auchmuty Carter, Swindon (GB)

(73) Assignee: Ubiquisys Limited, Swindon (GB)

(*) Notice: Subject to any disclaimer, the term of this patent is extended or adjusted under 35 U.S.C. 154(b) by 364 days.

(21) Appl. No.: 12/820,995

(22) Filed: Jun. 22, 2010

(65) Prior Publication Data

US 2011/0039570 A1 Feb. 17, 2011

(30) Foreign Application Priority Data

Aug. 11, 2009 (GB) .................................. 0914026.0

(51) Int. Cl.
*H04W 72/00* (2009.01)
*H04B 7/00* (2006.01)

(52) U.S. Cl.
USPC .......................... 455/452.2; 455/522; 455/561

(58) Field of Classification Search
None
See application file for complete search history.

(56) References Cited

U.S. PATENT DOCUMENTS

| | | | |
|---|---|---|---|
| 5,546,443 A | 8/1996 | Raith | |
| 5,548,806 A | 8/1996 | Yamaguchi et al. | |
| 5,625,672 A | 4/1997 | Yamada | |
| 5,666,655 A | 9/1997 | Ishikawa et al. | |
| 6,078,821 A | 6/2000 | Kaschke et al. | |
| 6,085,106 A | 7/2000 | Sendonaris et al. | |
| 6,301,478 B1 | 10/2001 | Wallstedt et al. | |
| 6,314,294 B1 | 11/2001 | Benveniste | |
| 6,553,235 B2 | 4/2003 | Bark | |
| 6,799,044 B1 | 9/2004 | Wesby et al. | |
| 6,957,087 B1 | 10/2005 | Hedberg | |
| 6,990,348 B1 | 1/2006 | Benveniste | |
| 8,032,142 B2 | 10/2011 | Carter et al. | |
| 2002/0077138 A1* | 6/2002 | Bark et al. .................. 455/522 |
| 2002/0082023 A1 | 6/2002 | Bark | |
| 2002/0119796 A1 | 8/2002 | Vanghi | |
| 2004/0192279 A1 | 9/2004 | Backes et al. | |
| 2005/0037763 A1 | 2/2005 | Hamamoto et al. | |
| 2005/0180351 A1 | 8/2005 | Peric | |
| 2006/0019665 A1 | 1/2006 | Aghvami et al. | |
| 2006/0223546 A1 | 10/2006 | Claussen | |
| 2006/0281412 A1 | 12/2006 | Skafidas et al. | |

(Continued)

FOREIGN PATENT DOCUMENTS

| | | |
|---|---|---|
| EP | 0717508 A2 | 6/1996 |
| EP | 0817400 | 1/1998 |

(Continued)

OTHER PUBLICATIONS

PCT International Search Report and Written Opinion dated Aug. 31, 2010 issued in PCT/GB2010/050680.

(Continued)

*Primary Examiner* — Erika A Washington
(74) *Attorney, Agent, or Firm* — Weaver Austin Villeneuve & Sampson LLP

(57) ABSTRACT

A downlink power is set for transmissions from a basestation of a cellular communications network, the cellular communications network comprising a group of such basestations. A target value for a signal strength with which the transmissions should be received, and a target value for a pathloss, based on measured values for pathlosses between basestations of the group, are both set. The downlink power is calculated, based on the target value for the signal strength, and on the target value for the pathloss.

13 Claims, 5 Drawing Sheets

U.S. PATENT DOCUMENTS

| | | |
|---|---|---|
| 2007/0042799 A1 | 2/2007 | Jubin et al. |
| 2007/0076650 A1 | 4/2007 | Manjeshwar et al. |
| 2007/0097939 A1 | 5/2007 | Nylander et al. |
| 2007/0099633 A1 | 5/2007 | Bamberger et al. |
| 2007/0104085 A1 | 5/2007 | Sambhwani et al. |
| 2007/0225029 A1 | 9/2007 | Abusch-Madger |
| 2007/0293260 A1 | 12/2007 | Xiao et al. |
| 2008/0037439 A1 | 2/2008 | Cave et al. |
| 2008/0188265 A1 | 8/2008 | Carter et al. |
| 2009/0042596 A1 | 2/2009 | Yavuz et al. |
| 2009/0046055 A1 | 2/2009 | Feng |
| 2009/0129291 A1 | 5/2009 | Gupta |
| 2009/0233616 A1 | 9/2009 | Kwon et al. |
| 2010/0035647 A1 | 2/2010 | Gholmieh et al. |
| 2010/0124930 A1 | 5/2010 | Andrews et al. |
| 2011/0009065 A1 | 1/2011 | Carter |
| 2011/0039570 A1 | 2/2011 | Maida et al. |
| 2011/0237244 A1 | 9/2011 | Hiltunen et al. |
| 2012/0046055 A1 | 2/2012 | Carter et al. |

FOREIGN PATENT DOCUMENTS

| | | |
|---|---|---|
| EP | 0865172 | 9/1998 |
| EP | 0936753 A2 | 8/1999 |
| EP | 0973353 | 1/2000 |
| EP | 1069702 A2 | 1/2001 |
| EP | 1189369 A1 | 3/2002 |
| EP | 1343336 A1 | 9/2003 |
| EP | 1 414 257 | 4/2004 |
| EP | 1657950 | 5/2006 |
| EP | 1 694 091 | 8/2006 |
| EP | 1780904 | 5/2007 |
| EP | 1796291 | 6/2007 |
| EP | 1895714 | 3/2008 |
| EP | 1912345 | 4/2008 |
| EP | 1912458 A1 | 4/2008 |
| EP | 1887709 A1 | 7/2008 |
| EP | 2095531 A2 | 9/2009 |
| EP | 2239875 A2 | 10/2010 |
| GB | 2 260 879 | 4/1993 |
| GB | 2318483 A | 4/1998 |
| GB | 2 359 452 | 8/2001 |
| GB | 2370729 | 7/2002 |
| GB | 2378089 A | 1/2003 |
| GB | 2390953 | 1/2004 |
| GB | 2 412 541 | 9/2005 |
| GB | 2 428 937 | 2/2007 |
| GB | 2443865 | 5/2008 |
| GB | 2 448 367 | 10/2008 |
| GB | 2 450 123 | 12/2008 |
| GB | 2481331 | 3/2012 |
| GB | 2481544 | 3/2012 |
| JP | 2002/218528 | 8/2002 |
| JP | 2003/219478 | 7/2003 |
| JP | 2004-266781 | 9/2004 |
| JP | 2006-135673 | 5/2006 |
| JP | 2006-222560 | 8/2006 |
| WO | WO 95/95513 | 4/1995 |
| WO | WO 96/31075 | 10/1996 |
| WO | WO 97/11567 | 3/1997 |
| WO | WO 98/59435 | 12/1998 |
| WO | 99/00914 | 1/1999 |
| WO | WO 99/34531 | 7/1999 |
| WO | WO 01/08322 | 2/2001 |
| WO | WO 01/52580 | 7/2001 |
| WO | WO 01/78327 | 10/2001 |
| WO | WO 02/054604 A2 | 7/2002 |
| WO | WO 03/096570 | 11/2003 |
| WO | WO 03101134 | 12/2003 |
| WO | WO 2005/046259 | 5/2005 |
| WO | WO 2005/069519 | 7/2005 |
| WO | WO 2006/083152 | 8/2006 |
| WO | WO 2006/107555 | 10/2006 |
| WO | WO 2007/015066 | 2/2007 |
| WO | WO 2007/040453 | 4/2007 |
| WO | WO 2007/044281 | 4/2007 |
| WO | WO 2007/051189 | 5/2007 |
| WO | WO 2008/082587 | 7/2008 |
| WO | WO 2008/093100 | 8/2008 |

OTHER PUBLICATIONS

UK Intellectual Property Office Search Report dated Nov. 11, 2009 issued in GB0914026.0.
Notice of Allowance dated May 31, 2011, U.S Appl. No. 11/801,337.
Non-final Office Action dated Aug. 23, 2010, U.S Appl. No. 11/801,337.
Office Action dated Feb. 7, 2012, U.S. Appl. No. 12/822,354.
UK Search Report dated Jun. 11, 2007, for related GB Application No. 0702094.4.
UK Intellectual Property Office Examination Report dated Dec. 13, 2010 issued in GB0702094.4.
U.K. Search Report dated Nov. 27, 2007 for U.K. Patent Application No. GB0702094.4, Access Point Power Control, 3 pages.
U.K. Search Report dated Nov. 30, 2007 for U.K. Patent Application No. GB0702094.4, Access Point Power Control, 3 pages.
U.K. Search Report dated Dec. 4, 2007 for U.K. Patent Application No. GB0702094.4, Access Point Power Control, 3 pages.
International Search Report dated Jun. 19, 2008 from corresponding International Application No. PCT/GB2008/000339.
International Search Report dated Nov. 28, 2008 from corresponding International Application No. PCT/GB2008/000339.
UK Intellectual Property Office Examination Report dated Dec. 13, 2010, issued in GB0702094.4.
Combined Search and Examination Report dated Oct. 26, 2011, GB Application No. GB1115805.2.
Combined Search and Examination Report dated Oct. 26, 2011, GB Application No. GB1115809.4.
Combined Search and Examination Report dated Oct. 26, 2011, GB Application No. GB1115813.6.
EP Examination Report dated Dec. 20, 2011, GB Application No. GB1115805.2.
EP Examination Report dated Dec. 20, 2011, GB Application No. GB1115809.4.
EP Examination Report dated Dec. 20, 2011, GB Application No. GB1115813.6.
UK Intellectual Property Office Search Report dated Aug. 20, 2009 issued in GB09117741.4.
International Search Report and Written Opinion dated Aug. 6, 2010 issued in Application No. PCT/GB2010/050695.
UK Combined Search and Examination Report dated Apr. 4, 2012, Application No. GB1203240.5.
Non-final Office Action dated Sep. 26, 2012, U.S. Appl. No. 12/822,354.
JP First Office Action dated Aug. 31, 2012, JP Application No. 2009-547759.
EP Second Examination Report dated Nov. 26, 2012, Application No. 10 720 945.4-1246.
Non-final Office Action dated Feb. 7, 2013 for U.S. Appl. No. 13/214,084.
Preliminary Amendment filed Feb. 13, 2013 for U.S. Appl. No. 13/706,263.
U.S. Appl. No. 13/705,063, filed Dec. 5, 2012, Carter et al.
U.S. Appl. No. 13/706,263, filed Dec. 5, 2012, Carter et al.
U.S. Appl. No. 13/725,665, filed Dec. 21, 2012, Maida et al.

* cited by examiner

POWER SETTING

This invention relates to a mobile communication network, and in particular to methods and systems whereby a cellular basestation can set its downlink transmission power.

It is known to establish femtocell access points in a building, in order to provide improved coverage for users of a cellular communication network, amongst other advantages. When a registered user device is within the coverage area of a femtocell access point, it can establish a connection with that access point, with the connection from the access point into the core network of the cellular network being established over a pre-existing broadband internet connection, for example. When the user leaves the coverage area of the femtocell access point, the connection can be handed over to a macrocell base station of the cellular network.

It is also known to establish a network of such femtocell access points.

One issue that arises with all cellular communications networks is that it is necessary for each basestation to transmit its downlink signals at a power that is sufficiently high to ensure that signals can be received over the whole of the intended coverage area. However, simply transmitting signals at the highest possible power is inefficient, and also risks causing interference. For example, there are only a limited number of scrambling codes, which must be shared between the basestations of the network. If all of the basestations are transmitting at their highest possible power, a user equipment would probably be able to detect signals from more than one basestation using the same scrambling code, and hence would be unable to distinguish between the transmissions from those basestations.

In the case of femtocell access points, each is responsible for setting its own downlink power, in a way that attempts to ensure adequate signal strength across its coverage area, while also achieving acceptable efficiency and levels of interference with other basestations. Where there is a network of femtocell access points, for example within a single building or otherwise within a relatively small area, each needs to set its downlink power such that there is acceptable signal quality over the whole of the intended coverage area.

According to a first aspect of the present invention, there is provided a method of setting a downlink power for transmissions from a basestation of a cellular communications network, the cellular communications network comprising a group of such basestations, the method comprising:
  determining a target value for a signal strength with which the transmission should be received;
  determining a target value for a pathloss, based on measured values for pathlosses between basestations of the group; and
  calculating the downlink power based on the target value for the signal strength, and on the target value for the pathloss.

Setting the downlink power in this way has the advantage that signals from the basestation should be able to be received satisfactorily across the intended coverage area.

According to other aspects of the invention, there are provided basestations and networks of such basestations that operate in accordance with the method of the first aspect.

Thus, in some embodiments, the downlink power of the basestation is set by setting a target value for the signal strength with which its transmissions should be receivable, and combining this with a value for the pathloss at the edge of an area at which the transmissions should be receivable. In embodiments of the invention, the value for the pathloss is set on the basis of measured values of the pathloss between basestations of the group. Setting the downlink power on this basis means that the transmissions from the basestation will in many cases be receivable at neighbouring basestations, thereby ensuring good overlap between the coverage areas of the basestation.

For a better understanding of the present invention, and to show how it may be put into effect, reference will now be made, by way of example, to the accompanying drawings, in which.

Figure 1:
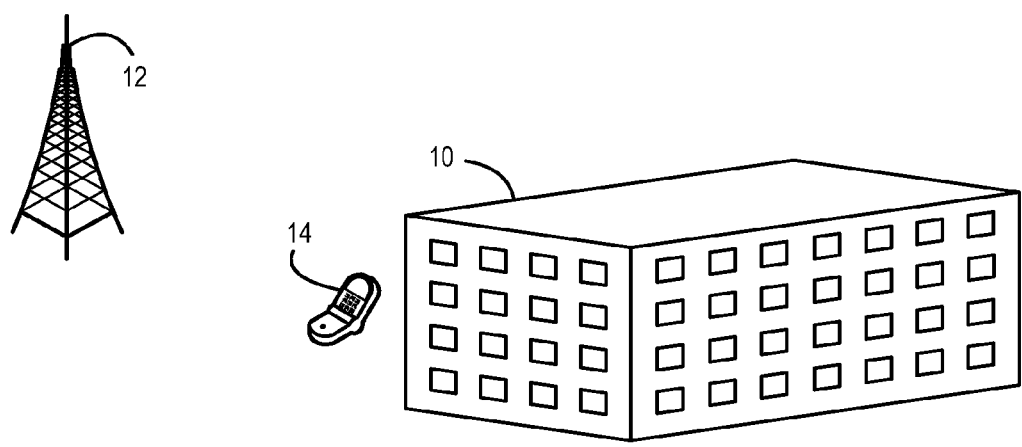
FIG. 1 shows a building in a coverage area of a cellular communications network.

FIG. 1 shows a building 10, which is located within the coverage area of a macrocell base station 12 of a cellular communications network. Thus, user devices, such as mobile phones 14, laptop computers and the like, that are in the vicinity of the building 10 can obtain a cellular service by establishing a connection into the cellular network through the macrocell base station 12.

However, it is known that cellular coverage within buildings can be poor, leading to unavailability of service, or forcing user devices to transmit signals at high transmit powers, leading to shorter battery life.

Femtocell access points are therefore deployed within the building 10, with the intention that user devices located within the building at least should be able to obtain a cellular service by establishing a connection into the cellular network through one of the femtocell access points.

Although the invention is described herein with reference to the deployment of femtocell access points within a building, within which users are expected to circulate, such as an office building, an educational establishment, or a shopping mall, it will be apparent that the invention is applicable to other situations. For example, the invention is equally applicable to outdoor deployment of femtocell access points, especially but not exclusively in locations where there is common ownership and/or management of an area in which users are expected to circulate.

Figure 2:
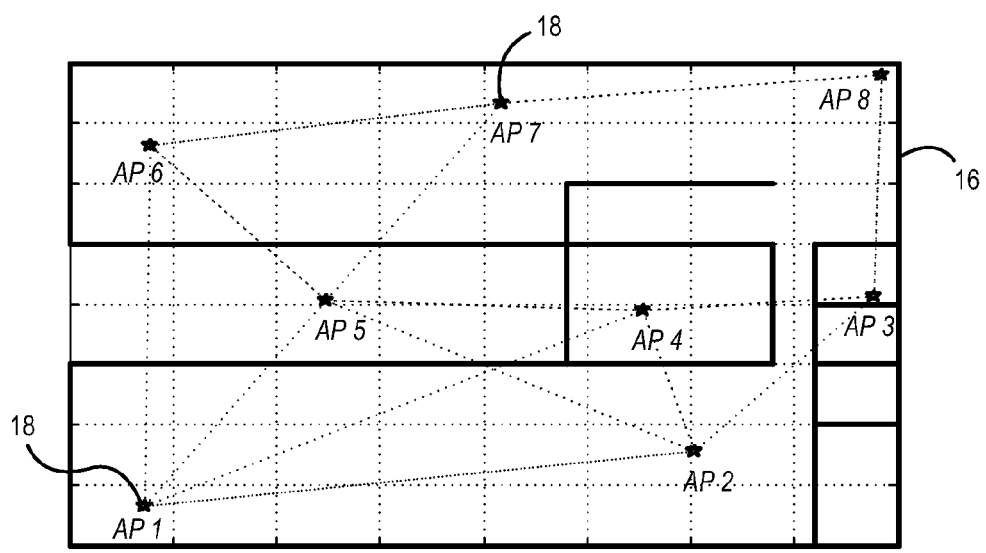
FIG. 2 shows the deployment of multiple femtocell access points in the building.

FIG. 2 is a schematic representation of one level 16 within the interior of the building 10. In this example, the building 10 is an office building, and the whole of the level 16 is occupied by a single corporate entity. Based on the number of expected users within the level 16 at any one time, a suitable number of femtocell access points 18 are deployed. The eight femtocell access points shown in FIG. 2 are indicated as AP1-AP8.

The femtocell access points 18 are located in suitable positions. For example, it may be appropriate to provide a femtocell access point close to the or each entrance/exit point, so that users entering or leaving the building can spend as long as possible connected to one of the femtocell access points. In addition, the femtocell access points should be distributed throughout the space, so that any user within the space will be able to establish a connection with one of the femtocell access points.

Figure 3:
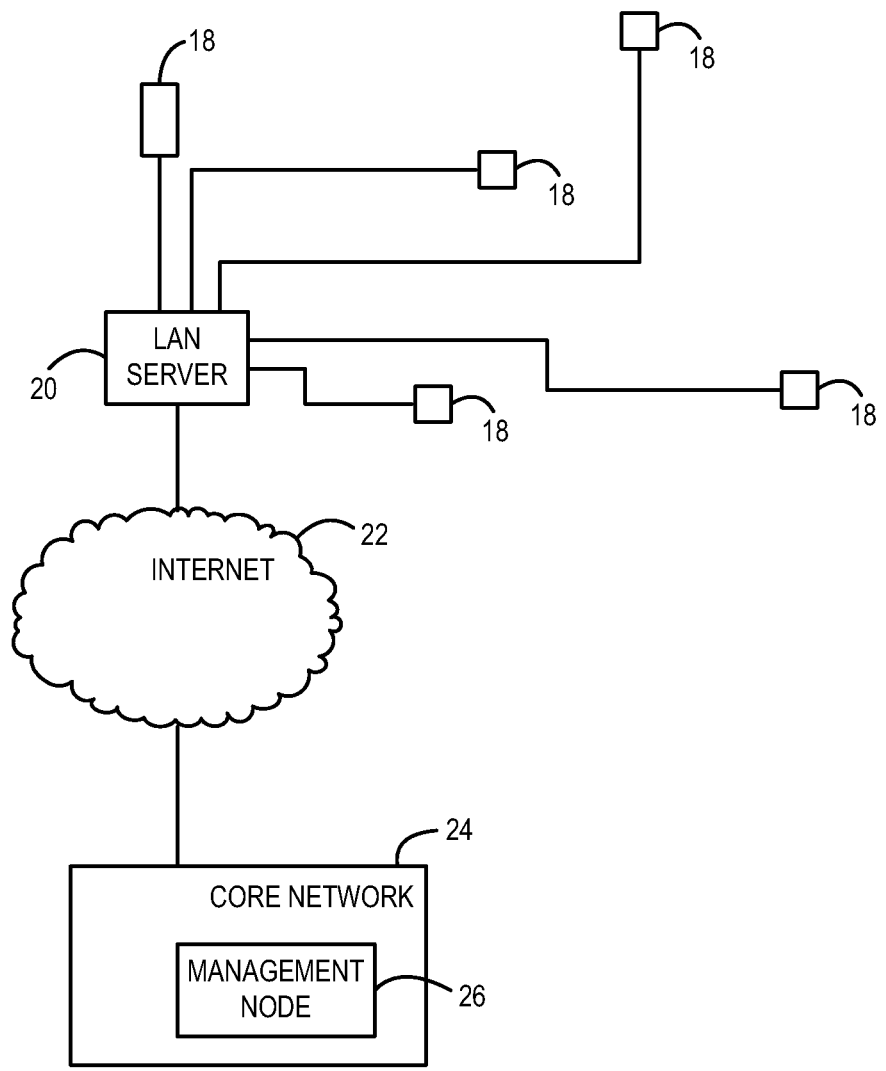
FIG. 3 is a schematic illustration showing the presence of femtocell access points in a wider communications network.

FIG. 3 is a schematic diagram, illustrating network connections of the femtocell access points. Specifically, the femtocell access points 18 in a group are all connected to a local area network (LAN) having a LAN server 20, which also has a connection to a wide area network 22, in particular a public wide area network such as the internet. The femtocell access points 18 are able to connect over the wide area network 22 to a core network 24 of the cellular communications network. The core network 24 includes a management node 26, which monitors and controls where necessary the operation of the femtocell access points 18.

In one embodiment of the invention, the management node 26 distributes to all femtocell access points 18 in the group the relevant information about the group, including: the IDs of all femtocell access points in the group; and their main RF parameters, such as the UTRA Absolute RF Channel Number (UARFCN) and scrambling code (SC), the Location Area Code (LAC) and Cell-ID, and the initial power levels. However, it should also be noted that the femtocell access points in the group are able to communicate directly with each other on a peer-to-peer basis.

Thus, the invention is described herein with reference to its use in an access point operating in accordance with existing cellular standards set by 3GPP. However, it will be appreciated that the same techniques can be used in networks using all existing and future networks in which the initial downlink power of an access point or basestation can be set based on information available at the time.

In this embodiment, the femtocell access point can enter the downlink monitor mode, in which it can detect signals transmitted by other femtocell access points, to capture the identities of the neighbouring femtocell access points. Thus, by matching the detected UARFCN/SC and LAC/Cell-ID transmitted by each femtocell access point with the information received from the management node 26, the femtocell access point 18 is able to populate automatically the neighbour table. This can then be used in the case of handovers for local mobility. Thus, mobility within the group is fully supported. Cell-reselection with other femtocell access points is achieved by each broadcasting the relevant carrier and scrambling code information. Handover from one femtocell access point to another can be achieved because each femtocell access point has a full map of its neighbour femtocell access points, including their IDs, and so it can send a handover command that is unequivocally pointing to a specific femtocell access point. Full support is provided for circuit-switched (CS), packet-switched (PS) and multiple Radio Access Bearer (Multi-RAB) call mobility, and for intra-frequency and inter-frequency handovers between femtocell access points.

In addition, each femtocell access point receives periodic measurement reports from its connected user equipments, with these reports indicating the signal strengths of intra-frequency neighbouring femtocell access points. Further, each femtocell access point sends measurement control messages to its connected user equipments that are operating in compressed mode, requiring them to provide periodic measurements of their inter-frequency neighbouring femtocell access points.

Further, each femtocell access point is able to communicate with the other femtocell access points by means of the local area network to which they are connected.

Figure 4:
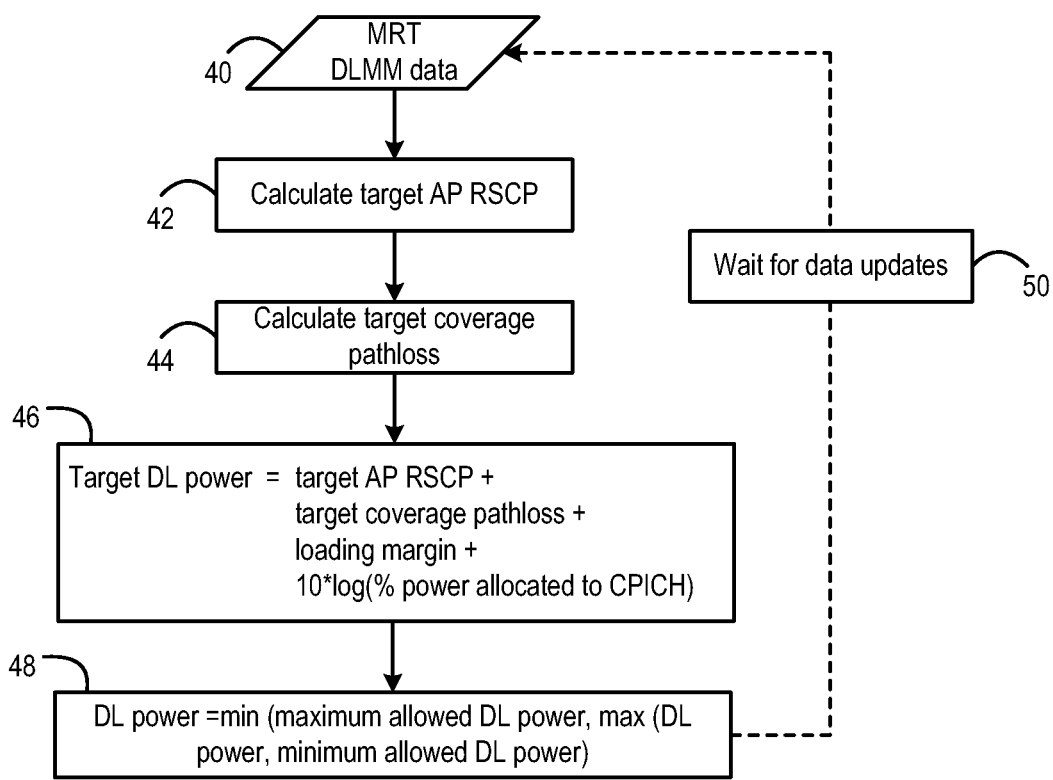
FIG. 4 is a flow chart illustrating a first process in accordance with the present invention.

FIG. 4 is a flow chart illustrating in general terms the procedure that is followed in a femtocell access point when setting its downlink power level. This procedure is preferably performed whenever the femtocell access point is powered up. The procedure can then be performed again whenever it appears that it would produce different results. For example, when the femtocell access point detects signals from a new nearby femtocell access point, the procedure can be performed again in order to check that the set downlink power remains optimal.

The procedure for setting the uplink power is not relevant for an understanding of the present invention, and is not described further herein.

The network of femtocell access points within an enterprise, as shown in FIGS. 2 and 3, relies on the coverage areas of the access points overlapping without any coverage holes, and with a high percentage of the overall coverage area having coverage of sufficient quality from more than access point, in order to ensure continuous coverage for user equipments throughout the overall coverage area, and to allow one access point to offload one or more calls to another access point to improve the overall user capacity of the system. The power setting also seeks to maximise signal quality across the overall coverage area, in order to ensure maximum data throughput. When deployed on a carrier that is in use by the macro layer, the femtocell access points should aim to minimise interference to the surrounding macro network.

In FIG. 4, the process begins at step 40, in which the femtocell access point receives information in the form of a Master Relationship Table (MRT) and also receives information obtained in its own downlink monitor mode (DLMM). In the DLMM, the femtocell access point is able to detect signals transmitted by other basestations, and is able to obtain the identity of each cell from which it is able to detect signals, and additional information such as the transmit powers used by such cells.

In addition, the femtocell access point notes the data contained in the current Master Relationship Table (MRT).

The Master Relationship Table includes the following information about each femtocell access point in the group, namely: the unique Cell ID of the femtocell access point; the Group ID of the femtocell access point; the frequency and Primary Scrambling Code selected by the femtocell access point; the Cell ID, Primary Scrambling Code, UARFCN, CPICH Tx power adjustment and CPICH Tx power of other femtocell access points and Macro Layer nodeBs detected by that femtocell access point; and strongest detected cell information.

Whenever a femtocell access point powers up for the first time it broadcasts a message to indicate that it now part of the network. A random femtocell access point then sends it a copy of the MRT so that it can start its automatic configuration.

New femtocell access points are always added into the MRT with a particular time stamp (known as the creation time stamp). The priority of the femtocell access point is sometimes determined by the value of the time stamp, as described below.

Whenever a femtocell access point changes its configuration (either chooses a new frequency and/or scrambling code, or updates the Mobility Table) it will rebroadcast the MRT over the local area network with these changes. In addition, the management system may remove femtocell access points from the MRT if they appear to be inactive.

In step 42, the femtocell access point calculates a target value for the Received Signal Code Power (RSCP) at the edge of the cell that it is serving. This calculation is described in more detail below.

In step 44, the femtocell access point calculates a target value for the coverage pathloss to that same edge of the cell. Again, this calculation is described in more detail below.

The strength of a signal at a point is determined by the power with which the signal was transmitted and the pathloss between the transmitter and that point. Therefore, a desired value for the transmit power can be obtained by combining (a)

the strength with which the signal is intended to be received at a point and (b) the pathloss between the transmitter and that point. Thus, in step 46, the femtocell access point combines the results obtained in steps 42 and 44 with some additional information to obtain a target value for the downlink power.

Specifically, the target value for the downlink power (Target DL Power) is calculated as:

$$\text{Target } DL \text{ Power} = \text{Target } AP \text{ } RSCP + \text{Target coverage pathloss} + \text{Loading Margin} + 10*\log(\% \text{ power allocated to } CPICH)$$

where:

Target AP RSCP is the target value for the RSCP calculated in step 42.

Target coverage pathloss is the target value for the coverage pathloss calculated in step 44.

Loading Margin is a parameter set in the management node 26 and notified to the femtocell access point. The parameter value might be in the range form −5 dB to 5 dB with a 1 dB resolution, and a default value of 0 dB. This provides a margin to ensure that the desired signal strength is achieved.

% power allocated to CPICH is a parameter set in the management node 26 and notified to the femtocell access point. This reflects the fact that the RSCP measurements are made on the CPICH signal, but the total transmit power takes account of the signals transmitted on the CPICH and other channels.

Thus, the target value for the downlink power is determined such that the femtocell access point can achieve the target RSCP at the edge of the cell, given the target pathloss and the other system parameters.

In step 48, the value that is actually set for the downlink power is determined, based on the target value calculated in step 46. Specifically, the target value for the downlink power is compared with the minimum allowed downlink power (which is set in a parameter notified to the femtocell access point by the management system), and the higher of these two values is compared with the maximum allowed downlink power (which is set in another parameter notified to the femtocell access point by the management system), and the actual downlink power is taken to be the lower of the two values in this second comparison. Thus, provided that the target value for the downlink power is between the maximum and minimum allowed power values, this target value is set as the actual power value. If the target value for the downlink power is above the maximum allowed power value or below the minimum allowed power value, the appropriate one of these threshold values is set as the actual power value.

It should be noted that the management system can specify different power range parameters for operation on a carrier that is in use by macro layer basestations, and for operation on a carrier that is not in use by macro layer basestations, and the femtocell access point should set its downlink power based on whether or not it is operating on a carrier that is in use by macro layer basestations.

When the downlink power has been calculated and applied, the calculation can be performed again in the event of any data update, as shown at step 50. For example, the procedure can run again, whenever a new femtocell access point is added to the enterprise network, or whenever a femtocell access point is removed from the network, or whenever the femtocell access point detects signals for the first time from another femtocell access point, or an updated MRT indicates that another femtocell access point has detected signals for the first time from the first femtocell access point.

Figure 5:
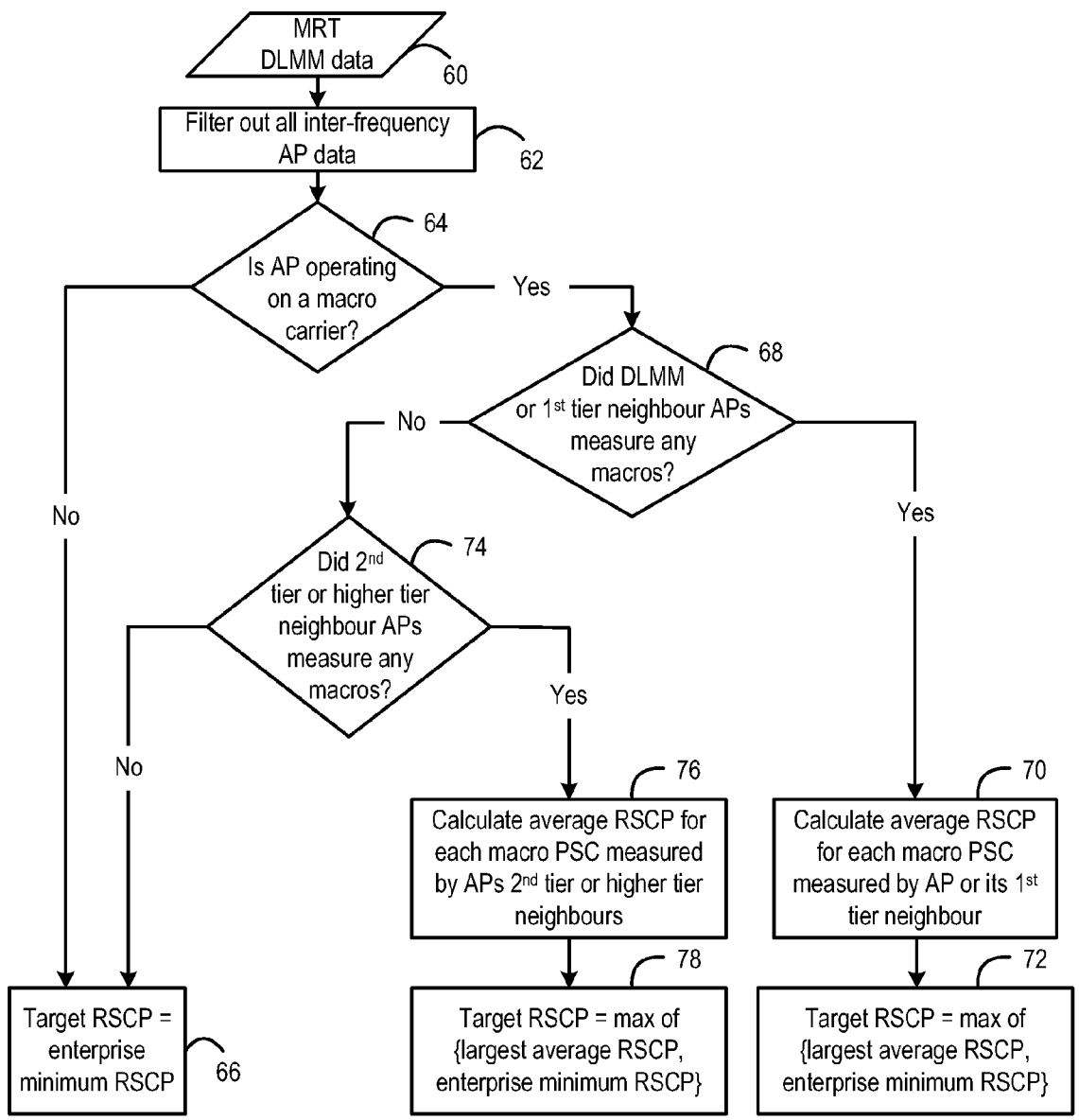
FIG. 5 is a flow chart illustrating in more detail a part of the process shown in FIG. 4.

FIG. 5 is a flow chart illustrating in more detail the step of calculating the target RSCP of a femtocell access point.

In step 60, the femtocell access point notes the data received in the latest MRT, and the information that it has received by monitoring the signals transmitted from other basestations in the cellular network.

The process involves categorizing the other femtocell access points in the group, in order to assess their closeness as neighbours. Based on the information received in step 60, the femtocell access point is able to divide the other femtocell access points in the group into tiers. The tier of a neighbour femtocell access point (or Macro Layer Neighbour) indicates the number of steps through which the femtocell access point has become aware of the neighbour.

Thus, a Tier 1 neighbour may be one which the femtocell access point has itself detected in its Downlink Monitor Mode. Alternatively, the neighbour may have detected the first femtocell access point in its own Downlink Monitor Mode, and the first femtocell access point may have become aware of this through the Master Relationship Table and reciprocated the relationship.

A Tier 2 neighbour is one which the femtocell access point has become aware of through a Tier 1 neighbour. Knowledge of the Tier 2 neighbour may be obtained from SIB (System Information Block) 11 of a Tier 1 femtocell access point or from a Macro Layer Neighbour. Alternatively, knowledge of the Tier 2 neighbour may be obtained by looking up the Master Relationship Table entry of a Tier 1 neighbour.

A Tier 3 neighbour is one which the femtocell access point has become aware of by looking up the Master Relationship Table entry of a Tier 2 neighbour. Depending on the size of the network, lower Tier neighbours might also exist, with the femtocell access point becoming aware of them through looking up the Master Relationship Table entry of a neighbour in the previous tier.

In step 62, the femtocell access point filters out from the received data all information that does not relate to the carrier on which it is operating.

In step 64, the femtocell access point determines whether the carrier on which it is operating should be regarded as a macro layer carrier. An access point is considered to be operating on a macro carrier if one or more of the following is true: either the access point is able to detect a primary scrambling code (PSC) of a macro layer basestation on its own carrier frequency when operating in its Downlink Monitor Mode; or the access point extracts a primary scrambling code (PSC) of one or more macro layer basestation on its own carrier frequency from System Information Block (SIB) 11 of a macro layer basestation on a different carrier frequency that it detected when operating in its Downlink Monitor Mode; or the access point extracts a primary scrambling code (PSC) of one or more macro layer basestation on its own carrier frequency from System Information Block (SIB) 11 of another femtocell access point, either on its own or a different carrier frequency, that it detected when operating in its Downlink Monitor Mode; or the MRT contains entries for the primary scrambling code (PSC) of one or more macro layer basestation on the carrier frequency that the first femtocell access point is operating on.

If it is determined that the carrier frequency on which the femtocell access point is operating is not a macro layer carrier, the process passes to step 66, in which the target RSCP of the femtocell access point is set to a predetermined level, which is the minimum RSCP set by the management system.

The value of this parameter might be set in the range from −50 dBm to −120 dBm with a 1 dB resolution, and the default value might be −100 dBm.

If it is determined in step 64 that the carrier frequency on which the femtocell access point is operating is a macro layer carrier, the process passes to step 68, in which the manner by which the carrier was determined to be a macro layer carrier is considered.

In step 68, it is determined whether the carrier was determined to be a macro layer carrier on the basis of information received by the femtocell access point in its Downlink Monitor Mode, or on the basis of information received from a Tier 1 neighbour. If so, the process passes to step 70.

In step 70, the femtocell access point calculates, for each of the primary scrambling codes that can be detected either by the femtocell access point or by one of its Tier 1 neighbours, the average RSCP. Thus, for each PSC, there may be multiple RSCP measurements, made in the femtocell access point performing the calculation and/or reported from neighbours of that femtocell access point, and the average RSCP is the average of these RSCP measurements. In carrying out this calculation, the femtocell access point uses only the measurements made by the femtocell access point itself and by the Tier 1 neighbours. Also, when calculating the average RSCP, linear averaging is used. That is, dB values are converted to linear values, then averaged and finally converted back to dB.

In step 72, the femtocell access point considers the average RSCP values obtained in step 70, and takes the largest of them. If this largest average value is larger than the predetermined minimum RSCP level mentioned above, then this largest average value is set as the target RSCP. This has the effect that transmissions from the femtocell access point will then typically be received at signal levels that are at least somewhat higher than signals from the surrounding macro layer cells. If it is not larger than the predetermined minimum RSCP level, the predetermined minimum RSCP level is set as the target RSCP.

If it is determined in step 68 that the carrier was not determined to be a macro layer carrier on the basis of information received by the femtocell access point in its Downlink Monitor Mode, or on the basis of information received from a Tier 1 neighbour (that is, it was determined to be a macro layer carrier on the basis of information measured by a higher Tier neighbour or from the MRT), the process passes to step 74.

In step 74, it is determined whether the carrier was determined to be a macro layer carrier on the basis of a measurement by a Tier 2 (or higher) neighbour. If it was not (that is, it was determined to be a macro layer carrier on the basis of information contained in the MRT), the process passes to step 66, in which the target RSCP of the femtocell access point is set to the minimum RSCP set by the management system, as described above.

If it is determined in step 74 that the carrier was determined to be a macro layer carrier on the basis of a measurement by a Tier 2 (or higher, i.e. Tier 1) neighbour, the process passes to step 76.

In step 76, the femtocell access point calculates, for each of the primary scrambling codes that can be detected either by the femtocell access point or by one of its Tier 2 (or higher Tier) neighbours, the average RSCP. Thus, for each PSC, there may be multiple RSCP measurements, made in the femtocell access point performing the calculation and/or reported from neighbours of that femtocell access point, and the average RSCP is the average of these RSCP measurements. In carrying out this calculation, the femtocell access point uses only the measurements made by the femtocell access point itself and by the Tier 2 (or higher Tier) neighbours. As before, when calculating the average RSCP, linear averaging is used. That is, dB values are converted to linear values, then averaged and finally converted back to dB.

In step 78, the femtocell access point considers the average RSCP values obtained in step 76, and takes the largest of them. If this largest average value is larger than the predetermined minimum RSCP level mentioned above, then this largest average value is set as the target RSCP. If it is not larger than the predetermined minimum RSCP level, the predetermined minimum RSCP level is set as the target RSCP.

Figure 6:
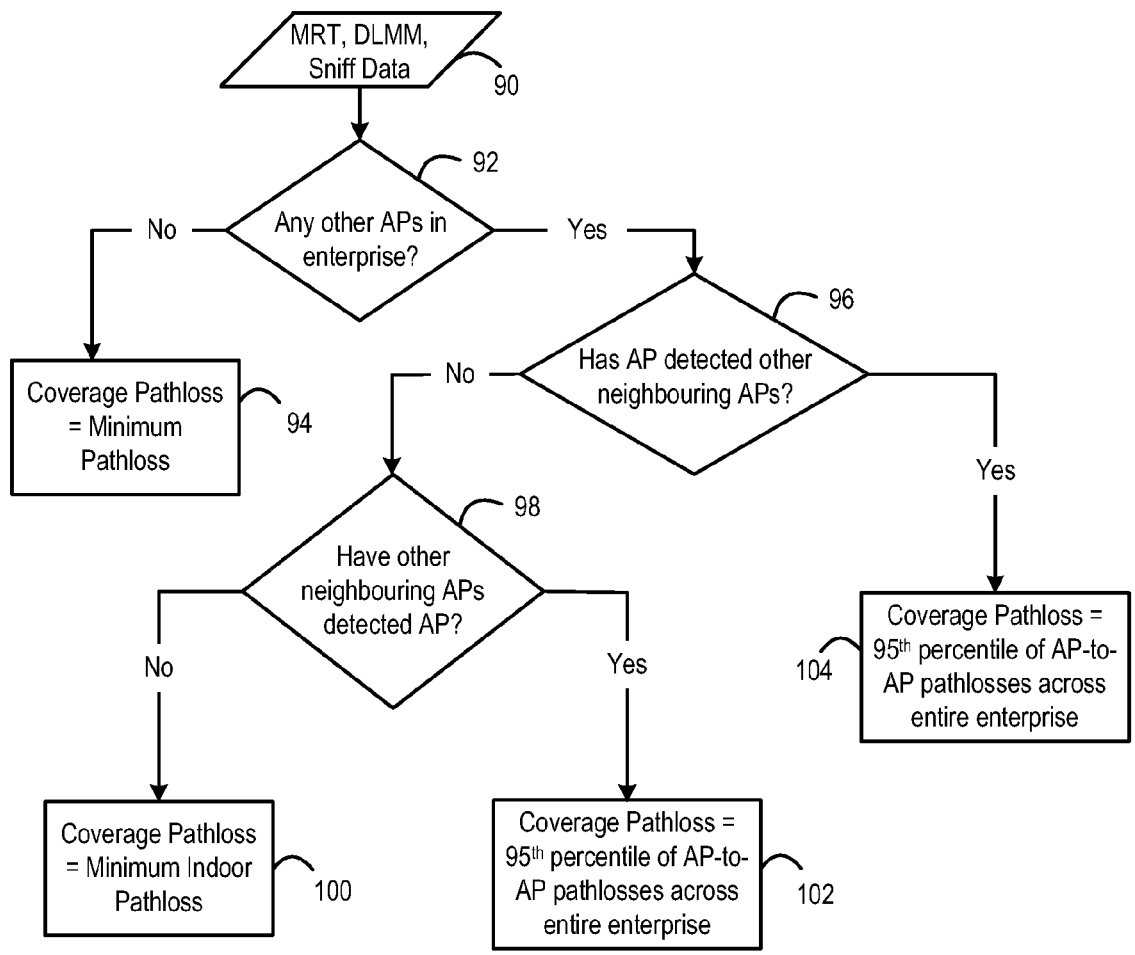
FIG. 6 is a flow chart illustrating in more detail a further part of the process shown in FIG. 4.

FIG. 6 is a flow chart illustrating in more detail the step of calculating in a femtocell access point the target coverage pathloss between that device and other femtocell access points, as shown in step 44 of FIG. 4.

In step 90, the femtocell access point notes the data received in the latest MRT, and the information that it has received by monitoring the signals transmitted from other basestations in the cellular network.

In step 92, the femtocell access point determines whether there are any other femtocell access points in the group managed by the relevant enterprise. It can be deduced from the MRT and other information relayed from the management node 28 whether there are any other femtocell access points in operation in the same group.

If it is determined in step 92 that there are no other femtocell access points in operation in the same group, the process passes to step 94, in which the target coverage pathloss is set to a predetermined value, set by the management system, that acts as the minimum pathloss value.

If it is determined in step 92 that there is at least one other femtocell access point in operation in the same group, the process passes to step 96, in which it is determined whether the femtocell access point itself has detected signals from any neighbouring femtocell access point. If not, the process passes to step 98.

In step 98, it is determined from the MRT whether any neighbouring femtocell access point of the first femtocell access point itself has detected signals from that first femtocell access point. If no neighbour has detected the access point performing the procedure, the process passes to step 100, in which again the target coverage pathloss is set to the predetermined minimum pathloss value.

If it is determined in step 98 that a neighbouring femtocell access point of the first femtocell access point itself has detected signals from the first femtocell access point, the process passes to step 102, and if it is determined in step 96 that the first femtocell access point has detected signals from a neighbouring femtocell access point, the process passes to step 104.

Thus, steps 102 and 104 are reached when the number of active femtocell access points has reached a certain density, specifically such that the femtocell access point performing the procedure is relatively close to at least one other femtocell access point in the group.

In both steps 102 and 104, the target coverage pathloss is set to a value that is higher than the minimum value set in steps 94 and 100. Specifically, in steps 102 and 104, the femtocell access point determines the pathlosses between all Tier 1 neighbour pairs of femtocell access points across the enterprise group. In each case, the power of the signals transmitted from each femtocell access point is known to the femtocell access point performing the calculation, as it will appear in the MRT. Each femtocell access point can also determine the RSCP with which it detects the signals transmitted from its Tier 1 neighbour femtocell access points. This information is distributed to other femtocell access points via the MRT. Based on this, the femtocell access point performing the calculation is able to determine the pathlosses between pairs of Tier 1 neighbour femtocell access points across the whole enterprise group.

The femtocell access point performing the calculation is then able to rank these pathlosses in order of their magnitude, and, in this embodiment, selects a value that is equal to the 95th percentile of the pathlosses (that is, the value that 95% of the values are below), and then sets the target coverage pathloss to be equal to this selected value. It will be appreciated that although the value equal to the 95th percentile is selected in this embodiment, this is based on a parameter that can be set by the management system, which could therefore require that the value equal to the 80th, 90th, 98th or any other percentile be chosen. However, in order to ensure that the downlink power is set high enough to ensure good overlap between the coverage areas of the femtocell access points, the target pathloss value should be set higher than a majority of calculated pathloss values, for example higher than at least 75% of calculated pathloss values.

Thus, the femtocell access point sets an assumed value for the pathlosses for its transmissions that is based on actual pathloss values that are found to exist in the network (although it sets this assumed value to be higher than the majority of the actual pathloss values that are found to exist). Therefore, for example in cases where relatively high pathlosses are found to exist (for example because the femtocell access points of the group are somewhat widely spaced apart, or because the femtocell access points are distributed through a space that contains a large number of walls that reduce signal strength), the target pathloss value will be set relatively high, and each new femtocell access point will set its initial downlink power to a relatively high value.

There is thus disclosed a system that allows each femtocell access point to set its own downlink power based on the conditions that exist in the network, allowing good coverage to be achieved, without causing unnecessary interference.

The invention claimed is:

1. A method of setting a downlink power for transmissions from a basestation of a cellular communications network, the cellular communications network comprising a group of such basestations, the method comprising:
   determining a target value for a signal strength with which the transmissions should be received;
      determining a target value for a pathloss, based on measured values for pathlosses between basestations of the group, wherein determining the target value for the pathloss comprises:
   obtaining a plurality of measurements for values of pathlosses between basestations of the group; and
   setting the target value for the pathloss to be equal to a value at a predetermined percentile of said plurality of measurements; and
   calculating the downlink power based on the target value for the signal strength, and on the target value for the pathloss.

2. A method as claimed in claim 1, wherein the step of obtaining a plurality of measurements for values of pathlosses between basestations of the group comprises obtaining a plurality of measurements for values of pathlosses between basestations that have a neighbour relationship to each other.

3. A method as claimed in claim 1, wherein the step of setting the target value for the pathloss comprises setting the target value to be greater than a predetermined percentage of said plurality of measurements, and wherein the predetermined percentage is greater than 75%.

4. A method as claimed in claim 1, comprising setting a predetermined minimum value for the target value for the pathloss, regardless of the measured values for pathlosses between basestations of the group.

5. A method as claimed in claim 1, wherein the step of determining the target value for the signal strength with which the transmissions should be received comprises:
   setting said target value based on the signal strengths with which transmissions from at least one basestation outside the group are received by at least one basestation in the group.

6. A method as claimed in claim 1, wherein the basestation comprises a femtocell access point, and the group of basestations comprises a group of femtocell access points connected over a local area network.

7. A method of setting a downlink power for transmissions from a basestation of a cellular communications network, the cellular communications network comprising a group of such basestations, the method comprising:
   determining a target value for a signal strength with which the transmissions should be received,
   wherein determining the target value for the signal strength with which the transmissions should be received comprises setting said target value based on the signal strengths with which transmissions from at least one basestation outside the group are received by at least one basestation in the group;
   determining a target value for a pathloss, based on measured values for pathlosses between basestations of the group;
   if the basestation or a neighbour of the basestation is able to detect any signals from one or more basestation outside the group:
   determining an average signal strength with which transmissions from the or each basestation outside the group are received by the basestation or the neighbour of the basestation; and
   setting said target value based on said determined average signal strength; and
   calculating the downlink power based on the target value for the signal strength, and on the target value for the pathloss.

8. A method as claimed in claim 7, further comprising,
   if the basestation or a neighbour of the basestation is able to detect any signals from more than one basestation outside the group:
   determining for each basestation outside the group an average signal strength with which transmissions from that basestation outside the group are received by the basestation or the neighbour of the basestation;
   identifying the basestation outside the group whose transmissions are received with the largest average signal strength by basestations within the group; and
      setting said target value based on the signal strength with which transmissions from the identified basestation are received by basestations within the group.

9. A method as claimed in claim 7, comprising setting a predetermined minimum value for the target value for the signal strength, regardless of the measured signal strengths with which transmissions from at least one basestation outside the group are received.

10. A method as claimed in claim 7, wherein the basestation comprises a femtocell access point, and the or each basestation outside the group comprises a macro layer basestation.

11. A method as claimed in claim 7, wherein the basestation comprises a femtocell access point, and the group of basestations comprises a group of femtocell access points connected over a local area network.

12. A basestation, for use in a cellular communications network comprising a group of such basestations, configured to set a downlink power for its transmissions by:
- determining a target value for a signal strength with which the transmissions should be received;
- determining a target value for a pathloss, based on measured values for pathlosses between basestations of the group, wherein determining the target value for the pathloss comprises:
- obtaining a plurality of measurements for values of pathlosses between basestations of the group; and
- setting the target value for the pathloss to be equal to a value at a predetermined percentile of said plurality of measurements; and
- calculating the downlink power based on the target value for the signal strength, and on the target value for the pathloss.

13. A basestation, for use in a cellular communications network comprising a group of such basestations, configured to set a downlink power for its transmissions by:
- determining a target value for a signal strength with which the transmissions should be received wherein determining the target value for the signal strength with which the transmissions should be received comprises setting said target value based on the signal strengths with which transmissions from at least one basestation outside the group are received by at least one basestation in the group;
- determining a target value for a pathloss, based on measured values for pathlosses between basestations of the group;
- if the basestation or a neighbour of the basestation is able to detect any signals from one or more basestation outside the group:
  - determining an average signal strength with which transmissions from the or each basestation outside the group are received by the basestation or the neighbour of the basestation; and
  - setting said target value based on said determined average signal strength; and
- calculating the downlink power based on the target value for the signal strength, and on the target value for the pathloss.

\* \* \* \* \*